(12) United States Patent
Xing et al.

(10) Patent No.: US 6,403,262 B1
(45) Date of Patent: Jun. 11, 2002

(54) LI-ION CELL WITH SHIELDED LEADS

(75) Inventors: Xuekun Xing, Richmond Heights; Jeffrey M. Smith, Hinckley, both of OH (US)

(73) Assignees: NTK Powerdex, Inc., Eastlake, OH (US); NGK Spark Plug Co., Ltd. (JP)

( * ) Notice: Subject to any disclaimer, the term of this patent is extended or adjusted under 35 U.S.C. 154(b) by 0 days.

(21) Appl. No.: 09/501,197

(22) Filed: Feb. 10, 2000

(51) Int. Cl.$^7$ .................................................. H01M 2/30
(52) U.S. Cl. ..................... 429/231.95; 429/65; 429/178; 429/181
(58) Field of Search .............................. 429/8, 65, 121, 429/167, 178, 185, 231.95, 240, 181

(56) References Cited

U.S. PATENT DOCUMENTS

| | | | | |
|---|---|---|---|---|
| 5,326,653 A | * | 7/1994 | Chang | 429/162 |
| RE35,746 E | * | 3/1998 | Lake | 429/127 |
| 6,004,693 A | * | 12/1999 | Fukuda et al. | 429/176 |
| 6,013,388 A | * | 7/2000 | Stadnick et al. | 429/120 |
| 6,242,182 B1 | * | 6/2001 | Tura et al. | 429/161 |
| 6,245,456 B1 | * | 6/2001 | Fukuda et al. | 429/122 |

* cited by examiner

*Primary Examiner*—Gabrielle Brouillette
*Assistant Examiner*—Monique Wills
(74) *Attorney, Agent, or Firm*—Mark Kusner; Michael A. Jaffe

(57) ABSTRACT

A Li-ion and/or Li-ion polymer cell, comprised of:

a first cathode section and a second cathode section, each cathode section having a cathode current collector in contact therewith, the cathode current collector comprised of a sheet of metal mesh having a tab portion extending outwardly from the sheet beyond the cathode section to form a cathode section lead, the cathode section lead from the first cathode section being disposed adjacent to the cathode section lead from the second cathode section; an anode section disposed between the cathode sections, the anode section having an anode current collector having a tab portion extending therefrom beyond the anode section to form an anode section lead; a separator layer disposed between the anode section and each of the cathode sections; and an adhesive protective layer applied to the tab portion of each cathode current collector where the tab portion extends from the sheet, the protective layers disposed between the tab portions to prevent shorts when the tab portions are pressed together to form a single positive lead.

17 Claims, 3 Drawing Sheets

LI-ION CELL WITH SHIELDED LEADS

FIELD OF THE INVENTION

The present invention relates generally to Li-ion batteries, and more particularly, to a Li-ion battery having shielded leads to reduce the likelihood of shorting.

BACKGROUND OF THE INVENTION

Broadly stated, a Li-ion cell is generally comprised of an anode section, a cathode section and a separator layer that is disposed between the anode section and the cathode section. A layer of a first conductive material is disposed within or in contact with the anode section. This layer forms what is conventionally referred to as an "anode current collector." A second layer of a conductive material is disposed within or in contact to the cathode section to form a "cathode current collector." It is conventionally known to use metal screens or meshes or foils to form the aforementioned current collectors. Typically, a copper mesh is used to form the anode current collector, and an aluminum metal mesh is used to form the cathode current collector. Current collectors are typically die-cut from sheets of metal mesh, and each current collector includes a tab portion that defines a battery lead. In this respect, an anode current collector will include a tab to define a battery's negative lead and the cathode current collector will include a tab to define a battery's positive lead.

A problem with using metal mesh as a current collector is that metal burrs or shards may be formed during the die-cutting process. These burrs or shards project at angles to the plane of the current collector. In the body of the cell, these burrs or shards generally do not create a problem as the layers of metal mesh forming the respective current collectors are generally maintained separate from each other by the respective layers of material forming the cell. However, the tabs forming the electrical leads extend beyond the peripheries of the anode section, cathode section and separator layers and do create a problem of shorting, particularly in a cell having two or more cathodes. In such cells, the leads of the cathode current collectors are typically in registry with each other and are pressed together to form one positive battery lead. Specifically, the aforementioned cells are enclosed within a housing or packaging. During the fabrication process, the packaging is usually sealed along the peripheral edges of the cell, thereby forcing like leads together. In most battery designs opposite leads are offset from each other so that they will not contact each other. Like leads, such as two cathode sections, are typically forced together and joined. It is at these locations where the burrs or shards are more likely to penetrate through the separator layers and short circuit the cell by coming into contact with layers of the opposite polarity.

The present invention overcomes this problem by providing a protective layer on the leads of the current collector where the leads extend from the cell to prevent burrs or shards on the current collectors from penetrating through the separator layer.

SUMMARY OF THE INVENTION

In accordance with the present invention, there is provided a Li-ion cell comprised of an anode layer, a cathode layer and a separator layer that is disposed between the anode layer and the cathode layer. A first, planar metal mesh layer is adjacent the anode layer. The first metal mesh layer has a coplanar tab extending beyond the separator layer to define a negative lead. A second, planar metal mesh layer is adjacent the cathode layer. The second metal mesh layer has a coplanar tab extending beyond the separator layer to form a positive lead. A first protective layer is applied on the coplanar tab of the first metal mesh layer. The first protective layer is disposed where the tab extends beyond the anode layer and is disposed on the surface of the tab facing the second metal mesh layer. A second protective layer is applied on the coplanar tab of the second metal mesh layer. A second protective layer is disposed where the tab extends beyond the cathode layer and is disposed on the surface of the tab facing the first metal mesh layer.

In accordance with another aspect of the present invention, there is provided a Li-ion cell, comprised of a first cathode section and a second cathode section. Each cathode section has a cathode current collector in contact therewith. The cathode current collector is comprised of a sheet of metal mesh having a tab portion that extends outwardly from the sheet beyond the cathode section to form a cathode section lead. The cathode section lead from the first cathode section is disposed adjacent to the cathode section lead from the second cathode section. An anode section is disposed between the cathode sections. The anode section has an anode current collector having a tab portion that extends therefrom beyond the anode section to form an anode section lead. A separator layer is disposed between the anode section and each of the cathode sections. A protective layer is applied to the tab portion of each cathode current collector where the tab portion extends from the sheet. The protective layers are disposed between the tab portions to prevent shorts when the tab portions are pressed together to form a single positive lead.

It is an object of the present invention to provide a Li-ion cell using metal mesh as current collectors.

It is another object of the present invention to provide a cell as described above that is less susceptible to failure from short-circuiting during fabrication.

Another object of the present invention is to provide a cell as described above having protective sleeves around the battery leads in the vicinity where the leads extend from the cell.

A still further object of the present invention is to provide a cell as described above having plastic tape surrounding each lead to isolate the lead from other battery components.

These and other objects and advantages will become apparent from the following description of a preferred embodiment of the invention, taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
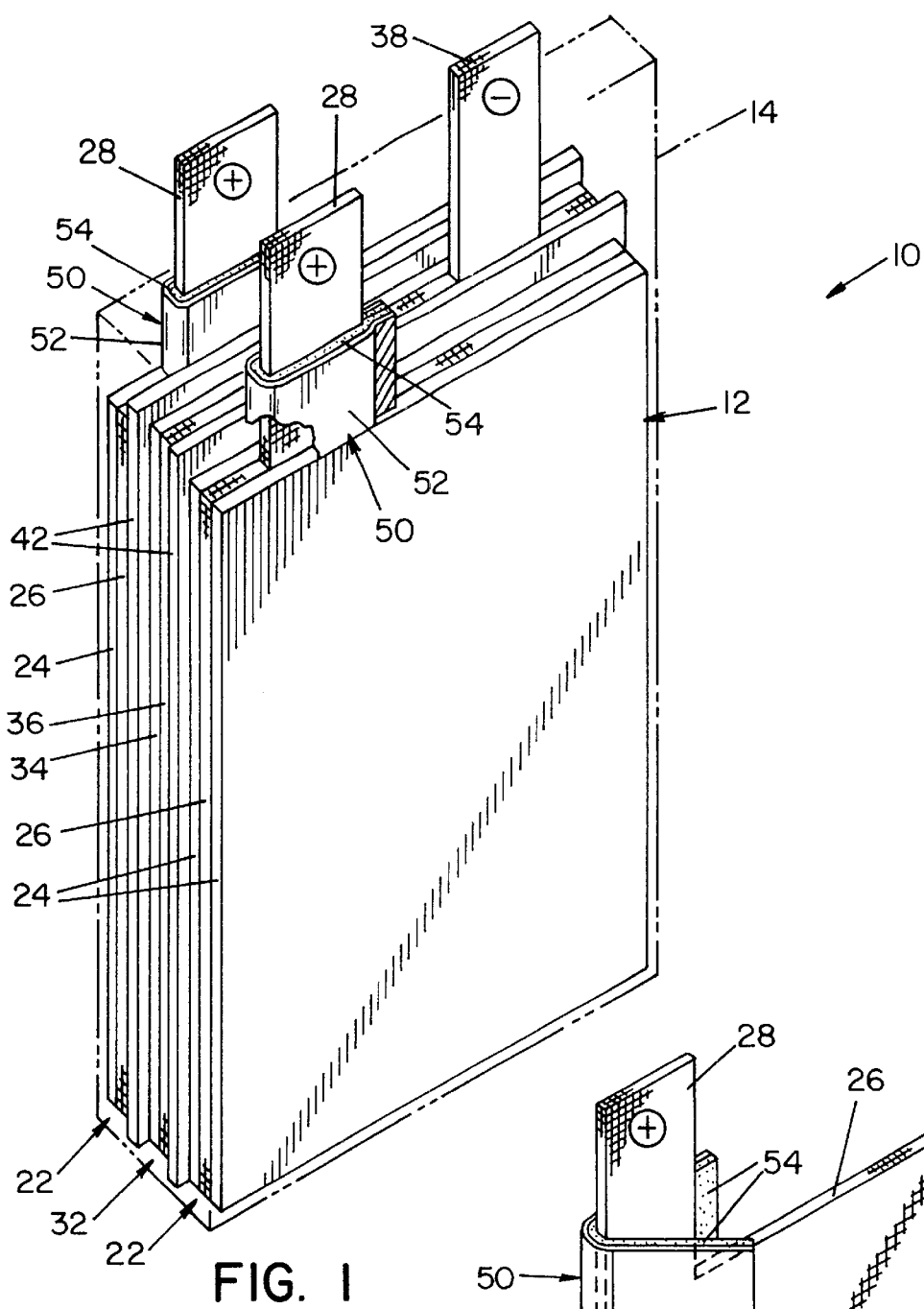
FIG. 1 is a perspective view of a cell illustrating a preferred embodiment of the present invention.

Referring now to the drawings wherein the showings are for the purpose of illustrating a preferred embodiment of the invention only, and not for the purpose of limiting same, FIG. 1 shows a battery 10 illustrating a preferred embodiment of the present invention. Battery 10 is formed of a polymer, electrolytic cell 12 contained within a package 14 (shown in phantom in the drawings) that is formed of a flexible laminate material. Cell 12 is preferably a lithium-based electrochemical cell. Cell 12 may be a primary (non-rechargeable) cell or a secondary (rechargeable) cell.

In the embodiment shown, cell 12 is a "bi-cell" comprised of two cathode sections 22 and an anode section 32. Each cathode section 22 is comprised of two layers 24 of a cathode film. The film-forming cathode layer 24 is preferably comprised of a lithiated metal oxide active material, a conductive material and a binder material. A current collector 26 formed of a metal screen or mesh is provided between each cathode layer 24. Each current collector 26 includes an outward extending tab or strip 28.

Anode section 32 is comprised of two layers of an anode film having a current collector 36 disposed therebetween. The film-forming anode layers 34 are preferably comprised of a carbon active material, a conductive material and a binder material. Current collector 36 includes an outward extending tab or strip 38 that defines the negative lead of battery 10.

Between anode section 32 and each cathode section 22, a separator film 42 is disposed. Separator film layer 42 is preferably formed of a polymeric matrix containing ionically conductive electrolyte.

Each cathode layer 24 preferably has a thickness of about 50 $\mu$m to about 300 $\mu$m, preferably about 100 $\mu$m to about 200 $\mu$m. Each anode layer 34 has a thickness of about 50 $\mu$m to about 300 $\mu$m, preferably about 100 $\mu$m to about 200 $\mu$m. Each separator layer 42 has a thickness of about 10 $\mu$m to about 75 $\mu$m, preferably about 15 $\mu$m to about 35 $\mu$m. Current collectors 26, 36 are preferably formed of a metal mesh or screen having a thickness of about 25 $\mu$m to about 50 $\mu$m. The overall thickness of cell 12 is about 800 $\mu$m or less, and preferably about 500 $\mu$m or less.

Figure 2:
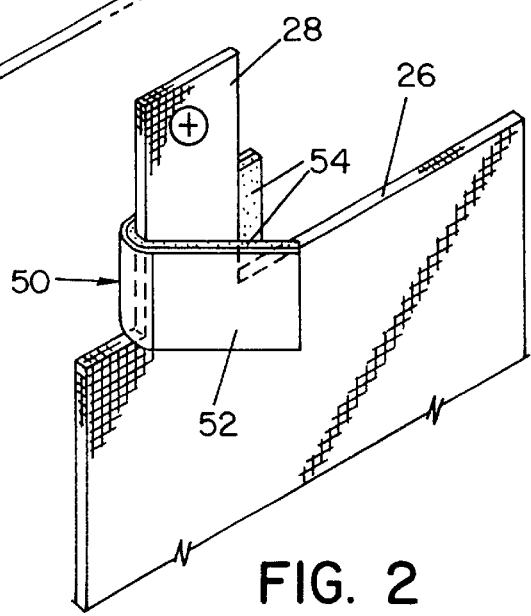
FIG. 2 is a perspective view of a current collector from the cell shown in FIG. 1, showing a protective layer surrounding the lead extending from the current collector.
Figure 3:
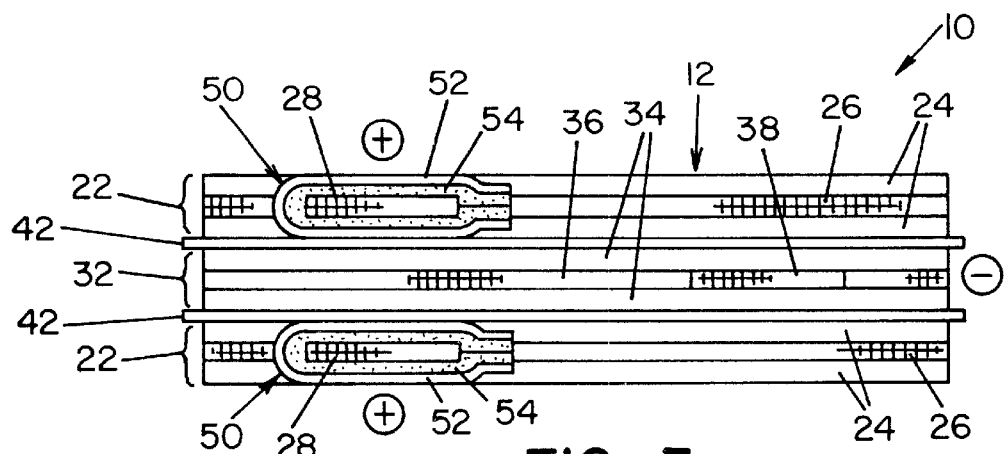
FIG. 3 is a top plan view of the cell shown in FIG. 1.
Figure 4:
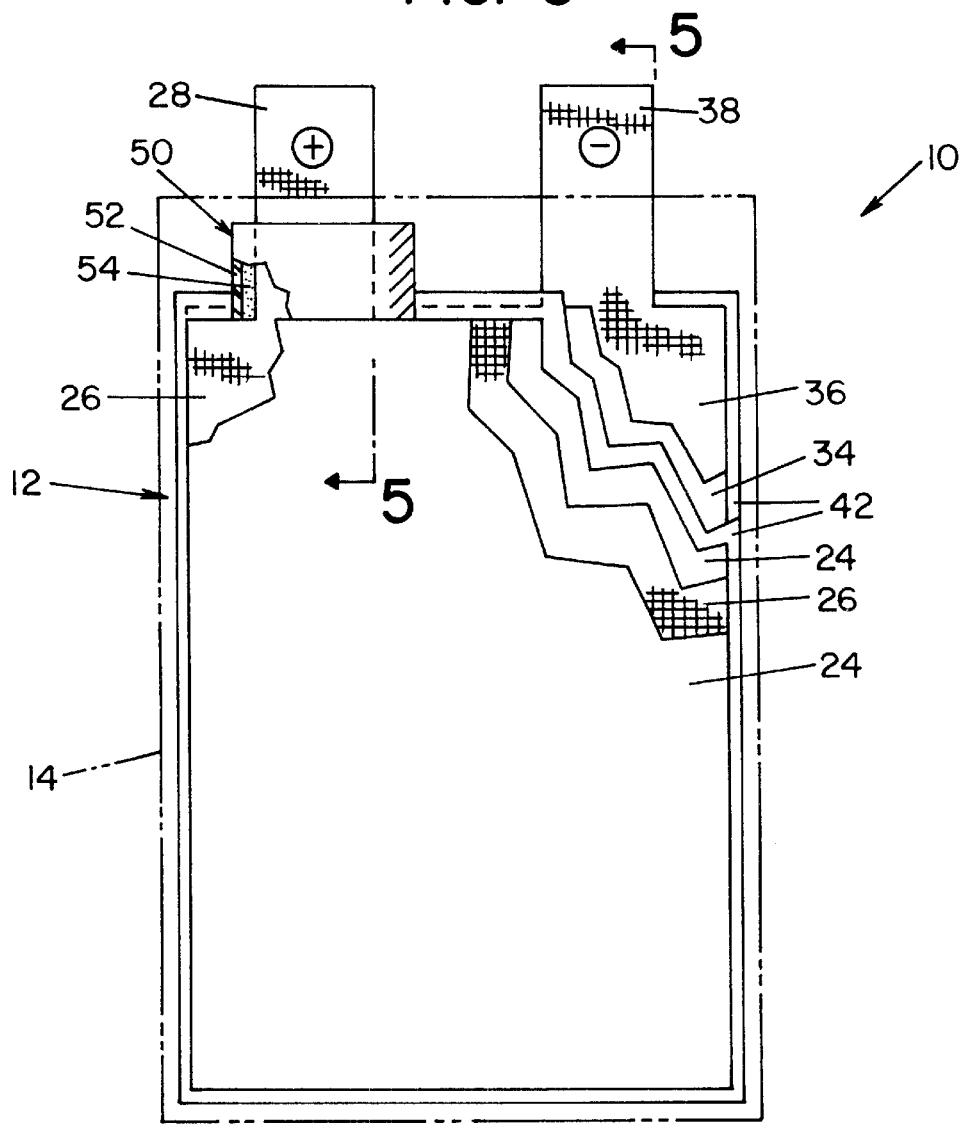
FIG. 4 is a front elevational view of the cell shown in FIG. 1.
Figure 5:
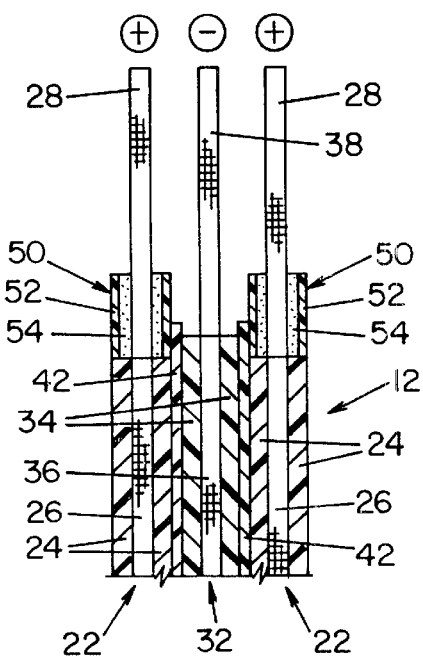
FIG. 5 is a partial, sectional view taken along lines 5—5 of FIG. 4.
Figure 7:
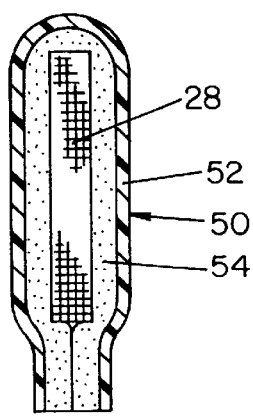
FIG. 7 is an enlarged sectional view taken along lines 7—7 of FIG. 6.
Figure 6:
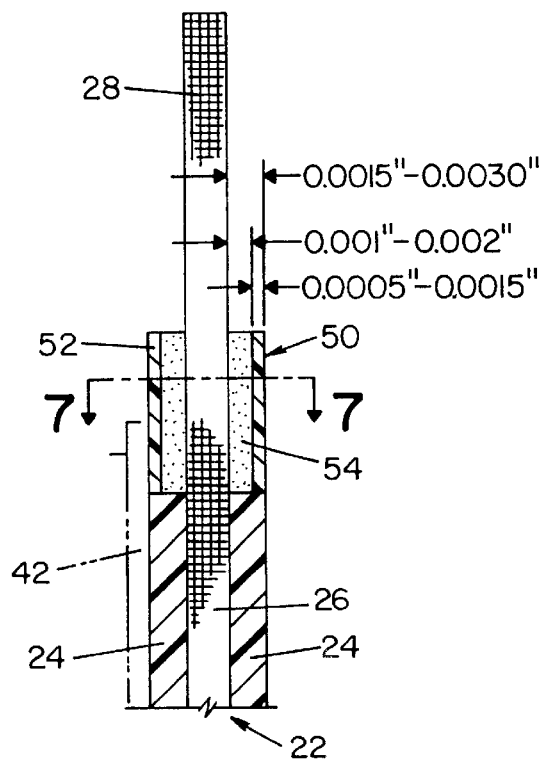
FIG. 6 is an enlarged fragmentary section of the area shown in FIG. 5.

As illustrated in FIG. 1, strips 28 of cathode current collectors 26 are disposed in registry with each other to be joined together to define a single positive lead of battery 10. In accordance with the present invention, a protective sleeve 50 is wrapped around tabs 28 of cathode current collectors 26. As illustrated in FIG. 2, protective sleeve 50 is disposed about tab 28 at the location where tab 28 extends from current collector 26. In this respect, a portion of protective sleeve 50 is disposed adjacent a portion of separator film 42, as best seen in FIG. 5. Protective sleeve 50 may be formed of two separate strips of material applied to the opposite sides of tab 28, but more preferably is comprised of a single strip of material that is wrapped around tab 28, as illustrated in FIGS. 2 and 7. In accordance with the present invention, protective sleeve 50 is comprised of an outer polymer layer 52 and an inner adhesive layer 54. Outer layer 52 is preferably formed of a tough, thin polymer material having high dielectric properties and that is inert to the components forming cell 12. Various plastic tapes find advantageous application in forming outer layer 52. Such plastic materials may include polyimide, polyester and the like. Polymeric outer layer 52 preferably has a thickness of about 0.0005 inches to about 0.0015 inches. The width of protective layer 52 is based upon the battery design. As indicated above, at least a portion of protective layer 52 will overlay separator layers 42.

Adhesive layer 54 is preferably formed of a non-conductive, thermosetting polymer, sealing material. An adhesive material, such as silicone, finds advantageous use as adhesive layer 54 in that this material is stable in the environment of a lithium ion cell. Other adhesive materials such as rubber or resin may also be used. The thickness of adhesive layer 54 is about 0.001 inches to about 0.002 inches. The total thickness of protective layer 50 is preferably about 0.0015 inches to about 0.0030 inches.

In accordance with the present invention, protective layer 50 may be applied manually or by automatic or semi-automatic operations. In this respect, protective layer 50 may be applied to current collectors 26 prior to their assembly in cell 12.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, cell 12 as heretofore described, disclosed cathode section 22 and anode section 32 as being formed from layers of generally solid material. It shall be appreciated by those skilled in the art that cathode sections 22 may be formed of a single layer of a viscous material having cathode current collectors embedded therein. Likewise, anode section 32 may be formed of a single layer of a viscous material having anode current collector 36 embedded therein. It is intended that all such modifications and alterations be included insofar as they come within the scope of the invention as claimed or the equivalents thereof.

Having described the invention, the following is claimed:

1. A Li-ion cell, comprised of:

two cathode sections;

an anode section disposed between said cathode sections;

a separator layer disposed between said anode section and each of said cathode sections;

a first, planar metal mesh layer within said anode section, said first metal mesh layer having a coplanar tab extending beyond said separator layer to define an anode section lead;

a second, planar metal mesh layer within said cathode section, said second metal mesh layer having a coplanar tab extending beyond said separator layer to form a cathode section lead;

a first protective layer, having an inner adhesive layer, is applied on said coplanar tab of said first metal mesh layer, said first protective layer disposed where said tab extends beyond said anode section and disposed on the surface of said tab facing said second metal mesh layer; and a second protective layer, having an inner adhesive layer, is applied on said coplanar tab of said second metal mesh layer, said second protective layer disposed where said tab extends beyond said cathode section and disposed on the surface of said tab facing said first metal mesh layer.

2. A Li-ion cell as defined in claim 1, wherein said first protective layer on said coplanar tab of said first metal mesh layer is essentially identical to said second protective layer on said coplanar tab of said second metal mesh layer.

3. A Li-ion cell as defined in claim 1, wherein said first second protective layers each includes an outer polymer layer.

4. A Li-ion cell as defined in claim 3, wherein said polymer layer has a thickness between about 0.0005 inches and about 0.0015 inches.

5. A Li-ion cell as defined in claim 4, wherein said outer polymer layer is comprised of polyimide.

6. A Li-ion cell as defined in claim 4, wherein said outer polymer layer is comprised of polyester.

7. A Li-ion cell as defined in claim 1, wherein said adhesive layer is comprised of silicone.

8. A Li-ion cell as defined in claim 7, wherein said adhesive layer has a thickness between about 0.001 inches and about 0.003 inches.

9. A Li-ion cell as defined in claim 4, wherein each of said protective layers has a thickness between about 0.0015 inches and about 0.003 inches.

10. A Li-ion cell, comprised of:
   a first cathode section and a second cathode section, each cathode section having a cathode current collector in contact therewith, said cathode current collector comprised of a sheet of metal mesh having a tab portion extending outwardly from said sheet beyond said cathode section to form a cathode section lead, said cathode section lead from said first cathode section being disposed adjacent to said cathode section lead from said second cathode section;
   an anode section disposed between said cathode sections, said anode section having an anode current collector having a tab portion extending therefrom beyond said anode section to form an anode section lead;
   a separator layer disposed between said anode section and each of said cathode sections; and
   a protective layer, having an inner adhesive layer, is applied to said tab portion of each cathode current collector where said tab portion extends from said sheet, said protective layers disposed between said tab portions to prevent shorts when said tab portions are pressed together to form a single positive lead.

11. A Li-ion cell as defined in claim 10, wherein said protective layer includes an outer polymer layer.

12. A Li-ion cell as defined in claim 11, wherein said polymer layer has a thickness between about 0.0005 inches and about 0.0015 inches.

13. A Li-ion cell as defined in claim 12, wherein said outer polymer layer is comprised of polyimide.

14. A Li-ion cell as defined in claim 12, wherein said outer polymer layer is comprised of polyester.

15. A Li-ion cell as defined in claim 10, wherein said adhesive layer has a thickness between about 0.001 inches and about 0.003 inches.

16. A Li-ion cell as defined in claim 15, wherein said adhesive layer is comprised of silicone.

17. A Li-ion cell as defined in claim 10, wherein each of said protective layers has a thickness between about 0.0015 inches and about 0.003 inches.

* * * * *